Figure 1:
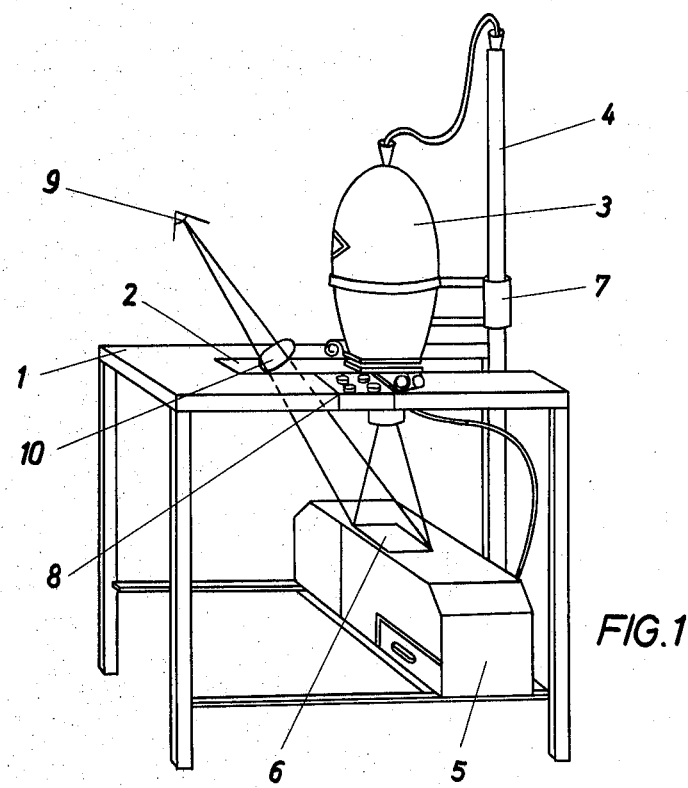

April 5, 1966  H. SIEGEL  3,244,070

PHOTOGRAPHIC ENLARGING APPARATUS

Filed Jan. 15, 1965

Inventor:
HANS SIEGEL
BY *Steward + Steward*
his Attorneys.

United States Patent Office 3,244,070
Patented Apr. 5, 1966

3,244,070
PHOTOGRAPHIC ENLARGING APPARATUS
Hans Siegel, Sterngasse 5, Ulm (Danube), Germany
Filed Jan. 15, 1965, Ser. No. 425,765
Claims priority, application Germany, Jan. 27, 1964,
S 89,232
4 Claims. (Cl. 88—24)

The present invention relates to a photographic enlarging apparatus for making enlargements of the entire negative size or selected sections thereof either on strips of an intermittently fed roll of photographic paper in a magazine or on individual sheets of photographic paper which may be held, for example, in the usual manner in suitable masks.

In prior enlarging apparatus of this type the paper roll magazine is generally placed underneath the enlarger head on a base which is disposed at the normal level of a table or forms the top of such a table. Consequently, the enlarger head and its negative holder are then located relatively high above this base in accordance with the desired enlargement ratio. Such an apparatus may be used for making enlargements individually or consecutively either of the entire negative size or of selected sections thereof on the paper in this magazine. If the apparatus is designed so as to permit the paper roll magazine to be removed from its base or table, it may also be used for making individual enlargements of any desired size on this base or table, for example, in suitable paper masks which are placed thereon. However, the operation of any of these apparatus is relatively slow and tiresome since the negatives have to be inserted into the negative holder of the enlarger head in an elevated position which is rather hard to reach, and also since the control knobs and switch buttons of such an apparatus are spaced considerably from each other. The insertion of each new negative requires the operator to lift his arms to the height of the negative holder which becomes very tiring within a short time. This is true especially when making enlargements of sections of negatives since this additionally requires each negative to be shifted around within the negative holder until the desired section to be enlarged has been located.

In order to overcome these disadvantages of standard enlarging apparatus and to permit the negatives to be more easily manipulated by placing the negative holder of the enlarger substantially within the plane of a normal table surface, other exposure apparatus have been developed which are generally known as "printers," in which the positions of the elements of a standard enlarger are reversed so that the negative image is projected in the upward direction and the photographic paper, the sensitive side of which faces downwardly, is fed, framed, and exposed above the actual enlarger.

Since in such a printer the distance between the planes of the negative and the paper is fixed, the enlargement ratio is likewise fixed. Each negative of a certain size has to be projected by a lens with a corresponding fixed focal length upon the paper in a paper holder in which usually the projected image of the entire negative is framed. Enlargements of sections of negatives can be made only with great difficulty and then only if a suitable assortment of lenses of different focal lengths and an associated assortment of negative holders are available. Obviously, such printers are extremely expensive and, since their enlargement ratio can only be adjusted in steps in accordance with the focal length of the different exchangeable lenses, they cannot be used for making individual enlargements of certain desired sections of negatives at any intermediate enlargement ratios.

It is an object of the present invention to provide a universal enlarging apparatus which may be operated almost as easily as an ordinary fixed-focus printer but may in addition be used for making individual or consecutive enlargements of selected sections of negatives at any desired enlargement ratio upon enlargement papers of certain fixed sizes in roll magazines and also for making individual enlaregments of any desired size and enlaregment ratio in the same manner as in a conventional enlarging apparatus.

For attaining this object, the present invention provides an enlarging apparatus which comprieses an enlarger head which may be of a conventional type and is adjustable on a vertical post to different levels, a table frame with a table plate thereon which is provided with an aperture which permits the enlarger head to be lowered to such an extent that the negative holder thereof will be located substantially within the same plane as the upper surface of the table plate, and means for removably mounting a paper roll magazine on this frame underneath the table plate. The aperture in the table plate is preferably elongated and made of such a length toward the front of the table that the operator of the apparatus, while sitting in front of the table, may look downwardly and through the aperture upon the roll magazine so as to observe the enlarged image of the negative or a selected section thereof in the framed size of the desired enlargement on the cover of the magazine. This magazine is preferably removably mounted on the table frame and adjustable to different positions at least within one horizontal plane, and it is preferably provided with a hinged light-tight cover over the framed part of a roll of photographic paper which is to be exposed for each enlargement when the cover is flipped up. For adjusting the negative in the enlarger and for focussing the projected image on the closed cover, the latter is provided on its outer side with a marking which corresponds to the frame size of the enlargements which may be made individually or consecutively in the magazine.

For making enlargements of the full size of the negatives on the paper in the roll magazine, the enlarger may be locked on its post in a lower end position in which the lens of the enlarger projects through the aperture in the table plate and the negative holder of the enlarger is located at or slightly above the level of the table surface. After the negatives have been inserted into the negative holder and the light in the enlarger has been switched on, the negative to be enlarged is shifted in the negative holder until the enlarged image is properly located within the frame marking on the outside of the magazine cover. If enlargements are to be made at a greater enlargement ratio of a section of a negative, the negative is shifted in the negative holder until the section to be enlarged is properly centered, and the enlarger head is then shifted upwardly on its post until the image of the section is projected at the proper size upon the cover of the magazine. Since the enlarger is preferably of the autofocus type, the enlarged image will at any enlargement ratio be in sharp focus on the cover of the magazine and thus also on the photographic paper when the cover is flipped up for making the enlargement. Of course, if the apparatus is not intended for also enlarging sections of negatives but only for making enlarged prints of the full negatives, the enlarger may be of a manually adjustable type without automatic focussing means.

For originally adjusting either an autofocus enlarger of the new apparatus or for determining the exact basic position of an enlarger of the manually adjustable type in which the full picture of a negative of a certain size will be projected in sharp focus and at the proper size upon the plane of the paper in a particular magazine, it is also possible to employ a special focussing device which is to be mounted in the table frame in place of the magazine and has a focussing surface of the same size and within the same plane as the paper which is to be exposed when the magazine is inserted into the table frame.

The various operations of the apparatus including those of switching the enlarger light on and off either directly or by means of an automatic timer, of feeding the paper within the magazine, of opening and closing the magazine cover before and after each exposure, of cutting the exposed piece of paper off the paper roll within the magazine may be controlled in the conventional manner by means of switch buttons which are located on the table surface. These electric controls may also be connected to the regular room light of the darkroom so that this light will be switched off automatically only during the exposures.

A particular advantage of the apparatus according to the invention consists in its versatility. First, it may be used for making consecutive enlargements of the full negatives at a fixed enlargement ratio, for which purpose the enlarger head is simply lowered to and locked on the enlarger post in a predetermined position at a certain minimum distance from the upper side of the magazine cover; second, it may be used for making enlargements of desired sections of negatives at any enlargement ratio on the paper in the magazine; and third, it may be used for making enlargements of any desired size and enlargement ratio on the table surface. For this last purpose, the enlarger head—either with or without autofocussing device—is lifted to a higher position on the enlarger post and the aperture in the table plate is then covered by a suitable paper mask or the like on which the enlarged image is then projected first for the necessary adjustments and then for the exposures.

Figure 2:
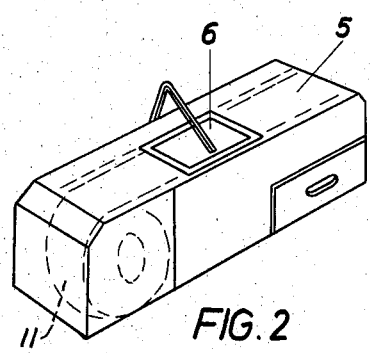
Figure 3:
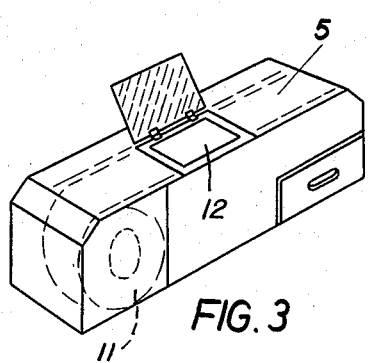

The features and advantages of the present invention will become more clearly apparent from the following detailed description thereof which is to be read with reference to the accompanying drawings, in which:

FIGURE 1 shows a perspective view of the entire enlarging apparatus according to the invention, while FIGURES 2 and 3 show perspective views of the paper roll magazine with its cover in the closed and open positions.

As illustrated in FIGURE 1, the apparatus according to the invention comprises a photographic enlarger head 3 of a conventional construction which may be either of the autofocus type or manually adjustable and may be raised and lowered to different levels on a vertical post 4 which is located at the rear side of a table frame with an upper table plate 1 which is provided with an elongated aperture 2 of such a width as to permit the enlarger head 3 to be lowered to a level at which the negative holder of the enlarger is substantially in horizontal alignment with the upper surface of the table plate 1. Underneath this table plate 1 a paper roll magazine 5 is removably mounted on cross bars of the table frame. This magazine, which may be of a conventional construction, is provided with a hinged cover 6, the upper side of which may be provided for adjustment and focussing purposes with a suitable marking of the inner frame size of the standard enlargements which may be made when the cover 6 is opened.

The front part of the aperture 2 in the table plate 1 is made of such a length and width as to permit the operator while sitting in front of the table 1 to look through this aperture so as to observe the cover 6 of the magazine 5 and to focus and adjust the enlarged image thereon. For sharp focussing of the image at the desired enlargement ratio on the closed cover 6, a magnifying glass 10 may be mounted on the table plate 1 at the proper distance from the eye 9 of the operator and the cover 6.

FIGURES 2 and 3 illustrate the paper roll magazine 5 which is provided with a lateral drawer for removing the exposed sheets of paper which have been cut off the roll 11 after each exposure. In FIGURE 2, the cover 6 on which the frame size of the desired enlargements is marked is shown in the closed position, while in FIGURE 3 it is shown in the open position in which it uncovers the section 12 of enlarging paper which is to be exposed.

FIGURE 1 further indicates the switch buttons 8 on the table surface 1 which are required for controlling the different electrical operation of the apparatus for making the desired exposures, including the manual or automatic timing of the exposures, the paper feed in the magazine 5, the opening and closing of the cover 6, and cutting off the exposed sheets in the magazine.

From the above description and the illustration in FIGURE 1 it is quite evident how simple and easy it is to manipulate the enlarging apparatus according to the invention. This is primarily due to the fact that the operator may sit comfortably in front of the table 1 and may normally insert the negatives practically without any physical effort into the negative holder of the enlarger 3 at or slightly above the level of the table surface 1. By varying the vertical setting of the enlarger head 3 by shifting its holder 7 upwardly from its basic position on the post 4, as illustrated in FIGURE 1, it is also possible to increase the enlargement ratio and to make enlargements of any desired sections of the negatives on the paper in the magazine. In addition, by further raising the enlarger head, it is possible to make enlargements of any desired size and enlargement ratio on suitable paper masks or the like which are placed on the table surface 1 over the aperture 2.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. A photographic enlarging apparatus comprising a frame having a table plate thereon at a normal table level, said table plate having an aperture therein, means for mounting photogrphic paper on said frame underneath said table plate, an enlarger head comprising a lens and a negative holder, and means for adjusting said enlarger head to different elevations upwardly of a basic position above said table plate, said lens in said basic position of said enlarger head projecting downwardly through said aperture, said negative holder in said basic position of said enlarger head being located within a horizontal plane substantially equal to the plane of the upper surface of said table plate so as to enable the operator of the apparatus to insert negatives easily into said holder while in a sitting position in front of said table plate, said enlarger head in said basic position having means to project the enlarged image of a negative in said negative holder in sharp focus and at a predetermined enlargement ratio upon said photographic paper mounting means, said aperture extending toward the front of said table plate such that the operator in said sitting position may look obliquely through said aperture upon the central part of the upper side of said photographic paper mounting means.

2. A photographic enlarging apparatus as defined in claim 1, wherein said means for mounting photographic paper includes a paper roll magazine the upper side of which has an aperture of a size corresponding to the framed size of each enlargement to be made in said magazine, and a lightproof cover for opening and closing said aperture, said cover having a marking on its outer side in vertical alignment with said aperture in said magazine for projecting the enlarged image thereon when said cover is closed.

3. A photographic enlarging apparatus as defined in claim 1, wherein said means for adjusting said enlarger head to different elevations above said basic position comprise a vertical post at the rear side of said frame and table plate and projecting above the latter, and means slidable along said post for connecting said enlarger head to said post.

4. A photographic enlarging apparatus as defined in claim 2, further comprising means on said table plate for mounting a magnifying glass thereon in a position within the line of vision of the operator in said sitting position through said aperture in said table plate upon said magazine cover.

References Cited by the Examiner
UNITED STATES PATENTS 2,927,503  3/1960  Zollinger _____ 88—24

NORTON ANSHER, *Primary Examiner.*

R. A. WINTERCORN, *Assistant Examiner.*